May 31, 1960

H. D. DRAIN 2,938,217

SINK MOUNTING

Filed April 17, 1956

2 Sheets-Sheet 1

INVENTOR.
Herbert D. Drain
BY
Cromwell, Greist & Warden
Attys.

SINK MOUNTING

Filed April 17, 1956

INVENTOR.
Herbert D. Drain
BY
Cromwell, Greist & Warden
Attys.

2,938,217

SINK MOUNTING

Herbert D. Drain, Barrington, Ill., assignor to Church of Religious Science, Los Angeles, Calif., a church corporation of California Filed Apr. 17, 1956, Ser. No. 578,619

10 Claims. (Cl. 4—187)

This invention relates to improvements in sink mountings for installing a sink of the flat flange type or similar member in an opening in a drainboard, cabinet top or like supporting structure.

In modern kitchen installations where a flat flange type sink or similar member is provided which is to be mounted in an opening in a drainboard, cabinet top, or like supporting structure, the mounting means generally provided comprises a sealing ring or molding strip of generally T-shaped cross section, which is adapted to be positioned between the edge of the sink flange and the edge of the drainboard in overlapped relation with respect to the sink flange and the top of the drainboard, and a plurality of adjustable clamping members, which are adapted to be positioned beneath the sink and the drainboard to rigidly secure the sealing ring in such relation so as to provide a watertight seal between the sink and the drainboard. To facilitate the installation of the sink and to insure that the sealing strip will be properly located with reference to the sink flange, it is in certain instances desirable to provide for initially assembling the sealing ring in proper relation to the sink flange and for connecting the same thereto so that the sink and the sealing ring may be inserted as a unit in the opening provided in the supporting structure, and it is an object of the present invention to provide in a sink mounting means of the type described an improved device for initially attaching the sealing strip or molding frame to the sink rim, prior to installation of the same as a unit in the aperture in the drainboard.

It is a further object of the present invention to provide in a sink mounting means of the type described apparatus for initially attaching the sealing strip or molding frame to the sink flange which comprises a plurality of clamping members adapted to be positioned in interlocking relation with depending portions of the molding frame, preferably adjacent the corners of the sink, and to engage in clamping relation beneath the sink rim and lock the frame in connected relation therewith, the clamping members being so constructed and arranged that they may be employed with a sink having corner reenforcing webs or the like extending between the external wall of the sink and the rim thereon.

It is another object of the invention to provide improved means for initially holding a peripheral rimmed member within a mounting frame to permit insertion of the member and the frame as a unit in an opening of a generally flat supporting structure, wherein the mounting frame is characterized by a top portion which is adapted to overlap both the rim of the member and the edge of the opening in the supporting structure and a web portion which is adapted to extend between said rim and the edge of the opening, the web portion being provided adjacent its lower edge with an inwardly directed shoulder formation which includes an abutment surface facing in the direction of the top portion of the frame and spaced a substantial distance below the rim and wherein the holding means comprises a plurality of holding devices for coaction with the rim of the member and the web portion of the frame, with each of the holding devices consisting of connected plate elements adapted to be positioned with end portions thereof engaging with the rim of the member and the shoulder formation at the lower edge of the web portion of the frame, respectively, and clamping screw elements carried by the lowermost one of the plate elements which are operative to urge the lowermost plate elements downwardly of the rim of the member and thereby rigidly clamp the rim of the member in position between the top and shoulder formation of the mounting frame.

It is a further object of the invention to provide in a mounting means for installing in an opening in a drainboard or similar supporting structure a flat flange type sink or similar member which mounting means is characterized by a molding frame of generally T-shaped cross section having a top portion adapted to overlie the sink flange and the edge of the opening in the drainboard and having a depending web or stem portion which is adapted to be positioned in depending relation in the space between the edge of the sink flange and the edge of the opening, a plurality of clamping elements for initially securing the molding frame to the sink flange so that the sink and the frame may be positioned as a unit in the opening which clamping elements have a plate-like portion engaging at one end in interlocking relation with the shoulder formation on the bottom edge of the web of the molding frame and extending inwardly thereof in overlying relation to the sink rim, a cooperating portion engaging between the outer edge of the sink rim and the web of the molding frame and a threaded clamping screw carried by the plate-like portion which is adapted, when taken up, to exert a downward pressure on the molding frame and clamp the same to the sink flange.

It is a still further object of the invention to provide in a mounting means for a flat flange type sink or similar member which comprises a molding frame of generally T-shaped cross section having a top portion adapted to overlie the sink flange and the edge of the drainboard or cabinet top structure in which the sink is positioned, and having a depending stem or web portion adapted to be positioned in the space between the edge of the sink flange and the edge of the opening in the drainboard, a plurality of clamping elements for initially securing the molding frame to the sink flange, whereby the sink and the molding frame may be installed as a unit in the drainboard or cabinet top, the clamping elements each comprising an angular lug member adapted to be positioned with one leg thereof overlying the sink flange and the other leg thereof extending between the edge of the sink flange and the stem of the molding frame, the leg which overlies the flange having a threaded aperture and a threaded adjusting screw engaged therein and the lug member having a hook formation at the junction of the legs thereof which is adapted to engage in interlocking relation with the shoulder formation along the lower edge of the depending stem portion of the molding frame.

These and other objects and advantages of the invention will be apparent from a consideration of the sink mounting and the several modifications thereof which are shown by way of illustration in the accompanying drawings, wherein.

Figure 1:
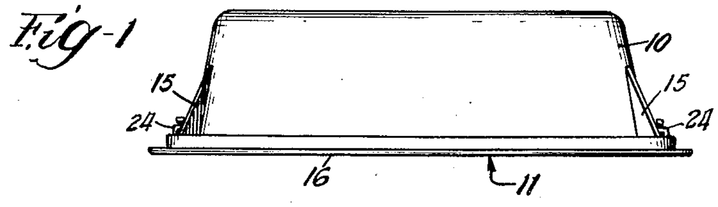
Fig. 1 is a side elevation of a sink in inverted position and assembled with the molding frame which is attached thereto in proper relation for insertion of the sink and the frame as a unit within an aperture in the supporting drainboard or other member.
Figure 2:
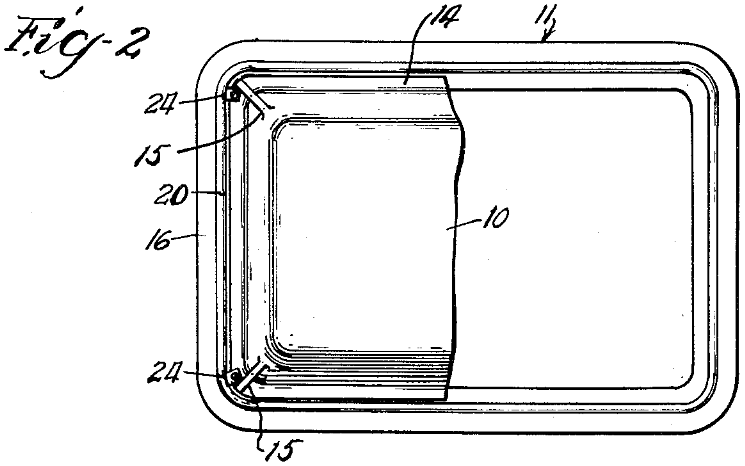
Fig. 2 is a bottom view with portions broken away of the sink installation shown in Fig. 1.
Figure 6:
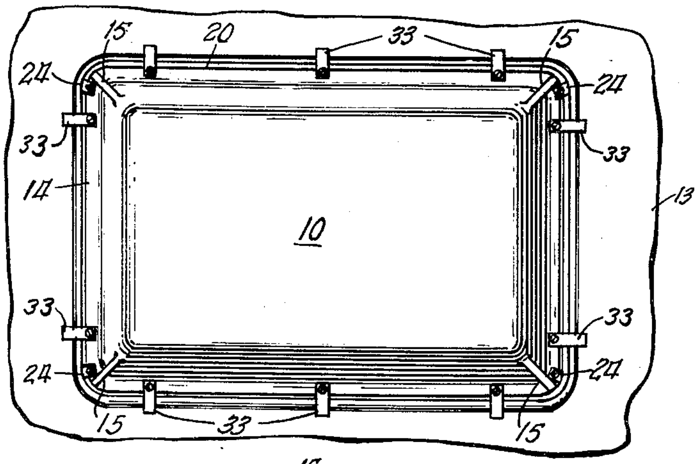
Fig. 6 is a bottom plan view of the sink and molding frame completely installed in the opening in the drainboard and secured in final clamped position therein.

Referring to the drawings, there is illustrated a sink 10 and molding frame assembly 11 which is adapted to be attached to the sink 10 prior to its installation in the aperture 12 in a drainboard 13, the sink 10 being first assembled with the frame member of the assembly 11 and the latter being clamped to the sink flange 14 while both members are in inverted relation. Thereafter, the assembled unit is inverted relative to the position shown in Fig. 1 and inserted in proper position within the drainboard aperture 12 as indicated in Fig. 6.

The sink 10 is of a type having an outwardly directed top rim or flange structure 14 with rounded corners. The top rim or flange 14 may be relatively narrow and may have reenforcing webs 15 extending in a vertical plane at the corners of the sink bowl. The drainboard 13 is a conventional plywood structure covered with linoleum or similar material which may be a cabinet top or other supporting surface and which is provided with the aperture 12 of the proper size and shape to receive the sink 10 with the molding frame assembly 11 attached thereto.

The molding frame assembly 11 comprises a sealing ring or molding frame member 16 of one piece construction. This member may be of extruded metal or it may be of folded or shaped plate material as illustrated. The T-shaped molding frame 16 is adapted to be positioned around the periphery of the sink flange or rim 14 with one side or top portion 17 overlying the top surface of the sink flange 14 and with the other side or top portion 18 extending in overlying relation to the adjoining top surface of the drainboard 13. The sealing ring 16 includes a depending web or stem portion 19 which is adapted to be positioned in the space between the outer edge of the sink flange and the edge of the drainboard 13 which surrounds the aperture 12. The sealing ring web or flange 19 is provided along its lower inner edge with an inwardly extending portion or shoulder formation 20 having a bottom face 21, an inner face or edge 22, and a top face 23, the latter extending on a slight angle downwardly towards the main portion of the web 19 so that an upwardly facing abutment formation is provided along the bottom edge of the web 19. The depth of the web 19 is sufficient to bring the bottom edge thereof approximately on the level with the bottom edge of the drainboard 13 on which the sink is mounted and below the bottom surface of the rim 14 on the sink 10.

When installing the sink 10 in the drainboard 13 it is frequently desirable, as in the case of cabinet tops, to first attach the sealing strip or molding frame member 16 to the flange or rim 14 of the sink 10, with the sink 10 and the sealing strip 16 being in the inverted position with respect to the final location of the same in the drainboard 13 so that the sink 10 and the sealing strip 16 may be properly located with respect to each other and the sealing strip 16 may be readily clamped to the sink flange 14 to retain the same in proper relation to the sink and permit the insertion of the sink 10 and the sealing strip 16 as a unit in the aperture 12.

A plurality of molding frame attaching or clamping elements or members 24 (Fig. 4) are provided for initially attaching the molding frame 16 to the sink flange 14. Each of the frame attaching members 24 is of angular shape providing generally vertical and horizontal leg members 25 and 26, extending in substantially right angled relation to each other. The vertical leg 25 is curved or bent inwardly somewhat from the free edge 27 toward the base thereof, this leg being adapted to be position on the inside of the stem or web portion 19 of the molding frame and to have its free edge extend in curved relation inwardly of the base of the stem 19 toward the peripheral edge or vertical face 28 of the flange 14. The member 24 is provided adjacent the juncture of the legs 25 and 26 with a downwardly facing recess or groove defined by a bottom forming surface 29 and a vertically extending intersecting surface 30. The member 24 is adapted to be positioned with the hook-like abutment formation or shoulder 20 at the bottom edge of the stem 19 of the molding frame 16 engaged in interlocking relation in the recess in the member 24 which is formed by the angularly related surfaces 29 and 30. A threaded aperture 31 is provided in the leg 26 of the clamping or attaching member 24 which receives in screw threaded relation therein a clamping screw 32.

Four of the frame attaching members 24 are employed to secure the frame member 16 to the sink rim 14, one being positioned adjacent each of the four corners of the sink 10 in interlocking or abutting engagement with the shoulder formation 20 on the web 19 of the frame member 16. The attaching members 24 are clamped in fixed relation by taking up on the screws 32 which engage at their inner ends beneath the sink flange 14. Each screw 32 tends to pivot its attaching member 24 about the shoulder formation 20 on the stem 19 of the molding frame with the result that the end 27 of the vertical leg 25 presses against the peripheral face 28 of the flange 14 and a downward pressure or pull is exerted on the frame 16 to clamp the same to the sink rim 14. When the sink is of the type having vertical corner reenforcing flanges or webs 15 the frame attaching members 24 may be positioned on one side or the other of the reinforcing flanges 15.

When the sink 10 and the molding frame member 16 are connected in assembled relation the resulting unit is positioned in the aperture or opening 12 in the drainboard 13 as shown in Fig. 6. Thereafter, a plurality of clamping elements 33 are arranged in spaced relation around the periphery of the sink flange 14 for securing the unit in final position in the opening 12.

Figures 3, 4, 7:
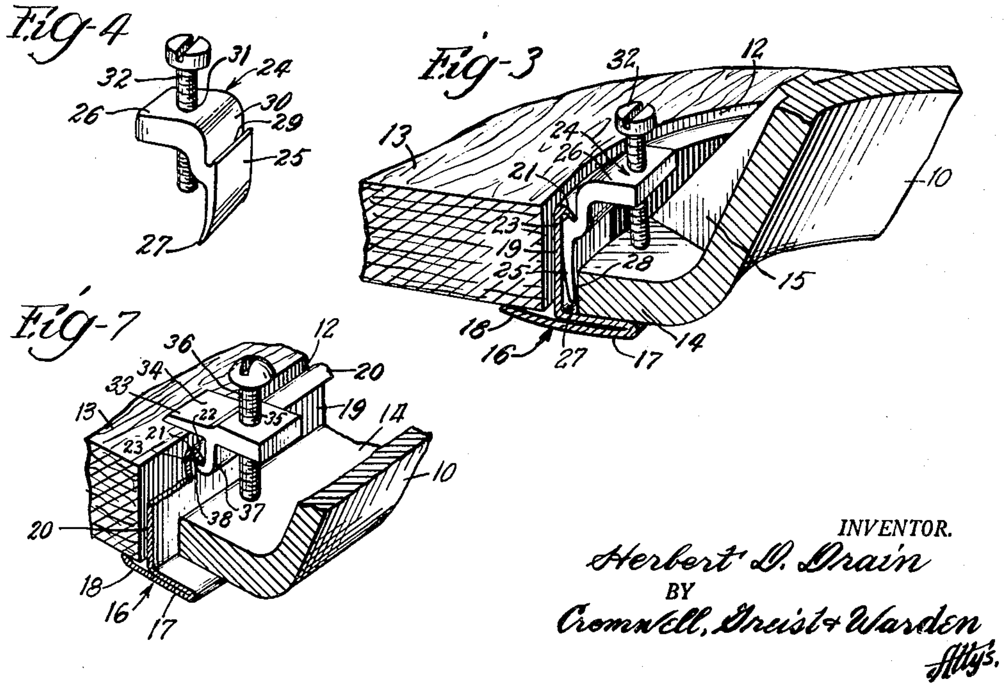
Fig. 3 is a bottom perspective view, to an enlarged scale, of the corner portion of the sink and frame showing one of the frame attaching members initially securing the molding frame in assembled relation with the sink rim.
Fig. 4 is a perspective view, to an enlarged scale, of one of the attaching members for initially securing the molding frame to the sink flange.
Fig. 7 is a sperspective view, to an enlarged scale, of a portion of the sink and frame showing one of the clamping elements which secure the unit in final position in the opening in the drainboard.
Figure 5:
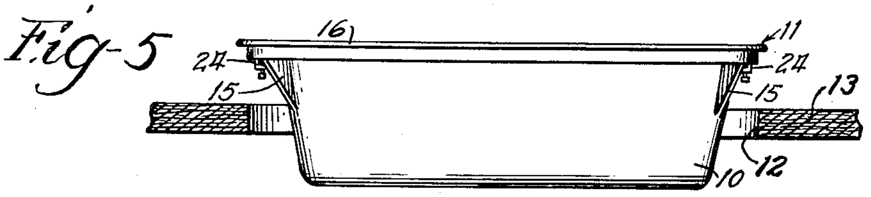
Fig. 5 is a side elevation of the sink with the clamping frame attached, the assembled unit being shown as inserted in the opening in the drainboard.

The clamping element or lugs 33 each comprise a generally rectangular plate or body portion 34 having at one end thereof a threaded aperture 35 and a clamping screw 36 which is adjustably secured therein. Intermediate the ends of the plate 34 there is provided an upstanding hook-like formation 37, the undersurface 38 of the hook end of which is beveled, or downwardly sloping, for cooperaton with the top surface 23 of the abutment shoulder 20 on the bottom of the web 19 of the molding frame member 16. The clamping elements 33 are each arranged with the opposite end of the plate portion 34 extending beneath the drainboard 13 and flange 14 of sink 10 as illustrated in Figs. 6 and 7. The hook or groove formations 37 on the clamping elements 33 are so constructed that the elements pivot about the shoulder formation 20 on the bottom of the web 19 engaged therewith. The apertured end of each of the elements 33 extends beneath the flange 14 of the sink 10 and the opposite end extends beneath the drainboard 13.

After the elements 33 are properly positioned in engagement with the sealing ring or frame member 16, the adjusting screws 36 are taken up to clamp the elements in position. The screws 36 tend to force the top of the sink flange 14 into snug relation with the top portion 17 of the sealing ring 16 and also to force the opposite end of the elements 33 into clamping relation with the bottom of the drainboard 13 and the top portion 18 of the molding strip 16 into tight engagement with the top of the drainboard 13. The molding frame member 16 together with the frame attaching and clamping members or lugs 24 and 33 may be provided as a kit for use when the sink 10 is installed in the opening 12 of the drainboard 13. The kit permits the molding frame to be initially assembled with the sink and the assembled unit to be readily installed either in the shop or in the field greatly facilitating the installation of the sink in either location.

Figure 8:
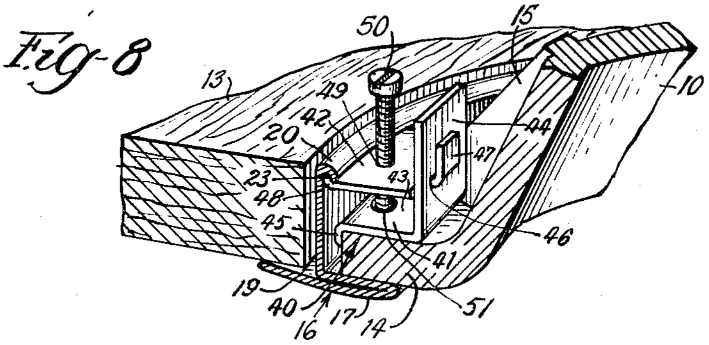
Fig. 8 is a bottom perspective view, to an enlarged scale, of the corner portion of the sink and frame showing a modified form of attaching member for securing the molding frame in assembled relation with the sink rim.

A modified form of molding frame attaching member 40 is illustrated in Fig. 8. This form of the device comprises two plate members or elements 41 and 42. The one plate member 41 is bent into angular form with a top leg 43 and a depending leg 44. The top leg 43 is adapted to be positioned against the under surface of the sink rim 14 and has a relatively narrow flange 45 at the free end thereof adapted to engage over the bottom corner edge of the sink rim 14. The depending leg 44 is slotted at 46 to receive a pivot forming tongue 47 formed on the inner end of the horizontally extending plate member 42. The tongue 47 may be formed on the plate 42 by cutting away the opposite corners of the plate member and bending the resulting tongue forming portion 47 at an angle to the plane of the plate. At its other or outer end the plate member 42 is provided with a relatively narrow hook-like flange formation 48 which is adapted to engage in interlocking relation with the inclined surface 23 of the shoulder formation 20 on the bottom edge of the web portion 19 of the molding frame 16. The lowermost plate member 42 is provided with a threaded aperture 49 which receives in threaded relation therein a clamping screw 50. The inner end of the clamping screw 50 is seated in a relatively shallow socket forming recess 51 in the lower face of the horizontal leg 43 of bent plate member 41. With the attaching member 40 positioned between the molding 16 and the sink rim 14 as shown in Fig. 8, taking up on the screw 50 urges the hooked ends of the plate members 41 and 42 away from each other with resultant clamping of the sink rim 14 between the top portion 17 of the frame 16 and the horizontal leg 43 of the plate member 41.

Figure 9:
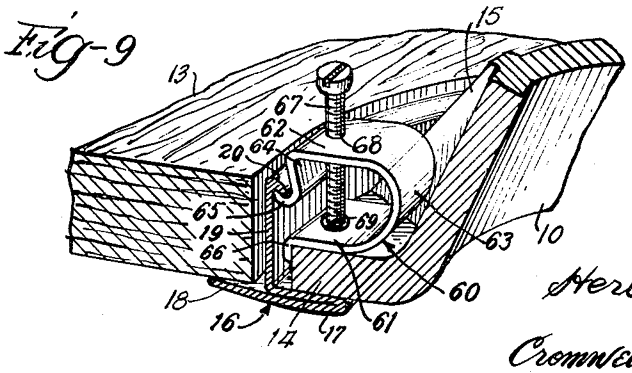
Fig. 9 is a bottom perspective view as in Fig. 8 showing a further modification of the molding frame attaching member.

Another modified form of molding frame attaching member 60 is illustrated in Fig. 9. In this form of the device, a strip of spring metal is bent into generally U-shaped form to provide, when assembled with the molding frame 16 and the sink 10, upper and lower horizontally disposed plate-like leg members 61 and 62 and a connecting bight portion 63. The plate members 61 and 62 are vertically spaced so that the lowermost member 62 is in a horizontal plane below the bottom edge of the web 19 of the molding frame 16. A vertical flange 64 is provided on the outer end of the member 62 which terminates in a hook formation 65 adapted to engage in interlocking relation with the hook-like abutment formation on the lower edge of the web 19 of the frame 16. A relatively narrow flange 66 is provided on the outer end of the member 61 which engages with the peripheral edge of the sink rim 14. A clamping screw 67 is carried by the member 62 in a threaded aperture 68 therein and the end thereof engages in a shallow socket forming recess 69 in the upper plate member 61. When the screw 67 is taken up, the two plate members 61 and 62 are urged in opposite directions and the rim 14 is clamped between the member 61 and the top portion 17 of the molding frame 16. In this form of attaching member 60 the hook and flange formations 64, 65 may be cut out in the center and the flange formation 66 may be cut out at the ends to provide clearance for the plate members 61 and 62 to move closer toward each other without interference between the non-connected end portions of the same.

In using the attaching members 24, 40 and 60, they are preferably positioned as close as possible to the reinforcing webs 15 at the corner of the sink 10. They may, of course, be employed for attaching a molding frame to a sink having a plain rim without the reinforcing webs and when properly aligned at the sink corners, they will tend to center the sink within the frame 16.

While specific details of construction have been referred to in describing the illustrated forms of the invention, it will be understood that other details may be resorted to within the spirit of the same. Also, the mounting herein disclosed is not intended to be limited to sink units but may be employed for securing in an apertured support a range unit or other member having a flanged edge or rim of the same general character as the flange of the sink illustrated.

I claim:

1. Means for holding a member having a generally flat peripheral rim within a mounting frame to permit downward insertion of the member and the mounting frame as a unit into an opening in a generally flat horizontal supporting structure, wherein said mounting frame is of generally T-shaped cross section and has a top portion, which overlies both the rim of the member and the edge of the opening, and a vertical web portion which extends downwardly between said rim and the edge of said opening, the web portion having adjacent its bottom edge an upwardly facing abutment forming shoulder formation; said holding means comprising two connected plate-like elements for coacting with the rim of the member and the web portion of the mounting frame, one of said plate-like elements being spaced below the top portion of the mounting frame for a distance greater than the thickness of the rim of the member and having a downwardly facing hook-like end portion for interengaging with the shoulder formation on the web portion of said mounting frame, said one element extending beneath said rim and having a clamping screw arranged to engage the other one of said plate-like elements for urging said one element downwardly away from the rim of said member, and the other one of said plate-like elements having a flanged end portion positioned between the web portion of the mounting frame and the rim of the member and in engagement with the latter whereby the rim of the member is clamped in position between the top and shoulder formations on the mounting frame.

2. Means for holding a member which has a peripheral rim within a mounting frame to permit insertion of the member and frame as a unit in an opening in a generally flat supporting structure, said mounting frame being characterized by a top portion which overlies both the rim of the member and the edge of the opening in the supporting structure and a web portion which extends between said rim and the edge of the opening, said web portion having adjacent its lower edge an abutment forming ledge which faces in the direction of the top portion of said frame and which is spaced a substantial distance below said rim, said holding means comprising a plurality of holding devices for coaction with the rim of the member and the web portion of the frame, each of said holding devices having one end portion thereof positioned in interengaging relation with the abutment forming edge on the mounting frame and the other end portion thereof positioned in engagement with the edge of the rim of the member, an intermediate portion of said holding device extending in overhanging relation with the outer marginal portion of the rim of the member and carrying a clamping screw which is positioned to exert positive pressure against the underside of said rim when it is taken up, whereby said holding devices clamp the rim of the member between the abutment ledge and the top portion of the mounting frame.

3. An assembly for positioning a generally rectangular member having a peripheral mounting flange in an apertured supporting structure comprising a mounting frame having a top portion which extends laterally over the top surface of the flange and the adjacent edge of the supporting structure and a stem portion which depends between the flange and the peripheral edge of the supporting structure, said stem portion having an upwardly facing hook-like shoulder formation adjacent the bottom edge thereof, and fastening devices for securing the frame to the flange, said fastening devices being positioned beneath the flange and each having a vertically directed portion extending between confronting portions of the edge of the flange and the stem of the frame which vertically directed portion bears against the edge of the flange, said fastening devices each having a horizontal portion extending beneath the flange of the member, and a downwardly facing hook-like formation on said horizontal portion positioned in pivotal engagement with said hook-like shoulder formation on the frame, and a clamping screw mounted on the horizontal portion with the end thereof engaging with and exerting pressure against the bottom surface of the flange, whereby when the screws in said fastening devices are taken up the fastening devices lock said frame in position on the member for installation of the member and frame as a unit.

4. Means for holding a member having a peripheral rim within a mounting frame to permit insertion of the member and frame as a unit in an opening in a generally flat supporting structure, wherein said mounting frame is characterized by a top portion which overlaps both the rim of the member and the edge of the opening in the supporting structure and a web portion which extends downwardly between said rim and the edge of said opening, said web portion having adjacent its lower edge a shoulder formation with an abutment surface which faces in the direction of the top portion of said frame and which is spaced a substantial distance below said rim; said holding means comprising a plurality of holding devices for coaction with the edge of the rim of the member and the web portion of the frame, each of said holding devices having a portion thereof in downwardly facing abutting engagement with the abutment surface on the shoulder formation of the web of the frame and bearing on said web, a portion extending upwardly between the edge of the rim of the member and the confronting web portion of the frame and engaging with the edge of the rim of the member, and another portion extending laterally of the web portion of the frame beneath the rim of the member and in spaced overlapping relation with the rim of the member, and a clamping screw in said laterally extending portion which engages with and exerts pressure against the underside of the rim of the member.

5. Means for holding a member having a generally flat peripheral rim within a mounting frame to permit downward insertion of the member and the mounting frame as a unit into an opening in a generally flat horizontal supporting structure, said mounting frame being of generally T-shaped cross section and having a top portion which overlies both the rim of the member and the edge of the opening, and a vertical web portion which extends downwardly between said rim and edge, which web portion has an upwardly facing abutment, said means comprising holding devices for coacting with the rim of the member and the web portion of the mounting frame, each of said holding devices consisting of a rigid element having angularly related legs, said element being arranged below the top portion of the mounting frame with one of the legs extending between confronting portions of the face of the web portion and the edge of the rim of the member and the other of the legs extending laterally beneath the rim of the member, said element having a downwardly facing hook formation at the juncture of the legs thereof which is engaged in pivotal relation with the abutment on the web portion of the mounting frame and a screw mounted in the laterally extending leg of each element and having adjustable engagement with the bottom face of the rim of the member to swing the element about its pivotal connection with the web portion and engage the other leg of the element with the edge of the rim of the member at a point above the pivotal connection of the hook formation with the web portion.

6. Means for holding a member having a peripheral rim within a mounting frame to permit insertion of the member and the frame as a unit in an opening of a generally flat supporting structure, wherein said mounting frame is characterized by a top portion which overlies both the rim of the member and the edge of the opening in the supporting structure and a web portion which extends between said rim and edge, the web portion having adjacent its lower edge a shoulder formation which includes an abutment surface facing in the direction of the top portion of the frame and spaced a substantial distance below said rim; said holding means comprising a plurality of holding devices for coaction with the rim of the member and the web portion of the frame, each of said holding devices consisting of a rigid member having legs in angular relation to each other, said member being positioned with one of the legs thereof extending along the web portion of the frame and having an abutment surface facing in the direction of the bottom of the web portion and in abutting engagement with said web abutment surface, said one leg engaging in abutting relation with a portion of said rim, said member having its other leg projecting beneath the rim of the member and said other leg having an adjustable clamping element mounted thereon which is in engagement with and exerts positive clamping pressure against the underside of the rim of the member.

7. Means for holding a member having a peripheral rim within a mounting frame to permit insertion of the member and frame as a unit in an opening in a generally flat supporting structure, wherein said mounting frame is characterized by a top portion which overlies both the rim of the member and the edge of the opening in the supporting structure and a web portion which extends downwardly between said rim and edge, and wherein the web portion has an abutment forming portion which faces in the direction of the top portion of said frame and which is spaced a substantial distance below said rim, said holding means comprising a plurality of holding devices for coaction with the rim of the member and the web portion of the frame, each of said holding devices having a portion thereof forming a downwardly facing abutment positioned in engagement with the abutment forming portion on the mounting frame, and another portion engaging with an edge portion of the rim of the member which is in confronting relation with a portion of said web, and each of said holding devices having still another portion positioned in vertically spaced underlying relation with the rim of the member and an adjustable clamping element on said last mentioned portion which extends upwardly thereof and which engages with and exerts positive clamping pressure against the underside of said rim.

8. Means for holding a member having a generally flat peripheral rim within a mounting frame to permit downward insertion of the member and the mounting frame as a unit into an opening in a generally flat horizontal supporting structure, said mounting frame being of generally T-shaped cross section and having a top portion, which overlies both the rim of the member and the edge of the opening, and a vertical web portion which extends downwardly between said rim and the edge of the opening and which is provided at its bottom edge with an upwardly facing abutment shoulder formation, said holding means comprising holding devices for coacting with the rim of the member and the web portion of the mounting frame, each of said holding devices consisting of two pivotally connected plate-like elements which are positioned between the mounting frame and the rim of the member for coaction with the shoulder formation on the web portion of said mounting frame, said plate-like elements projecting in spaced relation to each other beneath said rim with one of said plate-like elements having a portion extending between the inside face of said web portion and the confronting surface of the edge of said rim member, and the other of said plate-like elements having a downwardly facing abutment portion interengaging with the shoulder formation of said web portion and a screw mounted in said other plate-like element and extending upwardly toward the rim of the member for adjustably engaging said one plate-like member and urging the members apart whereby to secure the frame to the rim of the member.

9. Means for holding a member which has a peripheral rim within a mounting frame to permit insertion of the member and the frame as a unit in an opening of a generally flat supporting structure, wherein said mounting frame is characterized by a top portion which overlies both the rim of the member and the edge of the opening in the supporting structure and a web portion which extends between said rim and the edge of the opening, the web portion having adjacent its lower edge a shoulder formation which includes an abutment surface facing in the direction of the top portion of the frame and spaced a substantial distance below said rim; said holding means comprising a plurality of holding devices for coaction with the rim of the member and the web portion of the frame, each of said holding devices consisting of a pair of pivotally connected plate members arranged with one of said plate members having a portion thereof extending beneath the rim of the member and an angular end portion engaging the edge of the rim, the other one of said plate members having an abutment surface facing in the direction of the bottom portion of said frame and interengaging relation with said web abutment surface, and an adjustable clamping element mounted on said other one of said plate members and engaging said one plate portion for exerting pressure against the underside of said rim thereby to urge said plate members into clamping engagement with said web portion and with the rim of the member.

10. Means for holding a member having a generally flat peripheral rim within a mounting frame to permit downward insertion of the member and the mounting frame as a unit into an opening in a generally flat, horizontal supporting structure, wherein said mounting frame is characterized by a T-shaped cross section and having a top portion which overlies both the rim of the member and the edge of the opening, and a vertical web portion which extends downwardly between said rim and edge and has an upwardly facing abutment forming portion, said holding means comprising holding devices for coacting with the rim of the member and the web portion of the mounting frame, each of said holding devices consisting of a pair of connected plate-like elements which are arranged in horizontally disposed, vertically spaced relation below the top portion of the mounting frame and which extend beneath the rim of the member, one of said plate-like elements having a downwardly facing shoulder formation which is placed in interengaging relation with the abutment portion of the web of the mounting frame, the other one of said plate-like elements having a flange portion which engages with the rim of the member, and an extensible member mounted on one of said plate-like elements and engageable with the other of said plate-like elements for urging said elements apart and for adjustably clamping said elements between said web portion and the rim of the member.

References Cited in the file of this patent

UNITED STATES PATENTS

| | | |
|---|---|---|
| 1,040,572 | Otterson | Oct. 8, 1912 |
| 1,076,547 | Bullock | Oct. 21, 1913 |
| 1,877,835 | Feykert | Sept. 20, 1932 |
| 1,970,683 | Attick et al. | Aug. 21, 1934 |
| 2,440,324 | Blakeslee | Apr. 27, 1948 |
| 2,588,074 | Bair | Mar. 4, 1952 |
| 2,627,609 | Drain | Feb. 10, 1953 |
| 2,672,621 | Drain | Mar. 23, 1954 |
| 2,704,370 | Drain | Mar. 22, 1955 |
| 2,762,061 | Ball | Sept. 11, 1956 |
| 2,820,229 | Opstad | Jan. 21, 1958 |